United States Patent [19]

Rigollot

[11] 3,895,493

[45] July 22, 1975

[54] METHOD AND PLANT FOR THE STORAGE AND RECOVERY OF ENERGY FROM A RESERVOIR

[76] Inventor: Georges Alfred Rigollot, 66, ave. Henri-Martin, 75116 Paris, France

[22] Filed: Apr. 25, 1973

[21] Appl. No.: 354,447

[30] Foreign Application Priority Data
May 3, 1972 France.................... 72.15654

[52] U.S. Cl............. 60/659; 60/398; 137/1
[51] Int. Cl............. F01k 1/00; F01k 3/00
[58] Field of Search............ 60/371, 398, 413, 415, 60/1, 325, 371, 398, 413, 415, 652, 659; 137/206, 1

[56] References Cited
UNITED STATES PATENTS

| | | | |
|---|---|---|---|
| 344,960 | 7/1886 | Hagerty | 60/398 |
| 2,454,058 | 11/1948 | Hays | 60/398 |
| 2,484,183 | 10/1949 | Paulson | 60/398 |
| 3,303,649 | 2/1967 | Mastini | 60/325 |
| 3,436,914 | 4/1969 | Rosfelder | 60/398 |
| 3,601,979 | 8/1971 | Singer | 60/325 |
| 3,677,008 | 7/1972 | Koutz | 60/659 |

FOREIGN PATENTS OR APPLICATIONS
740,924  11/1932  France................ 60/525

Primary Examiner—Martin P. Schwadron
Assistant Examiner—H. Burks, Sr.

[57] ABSTRACT

The method of the invention consists in storing and re-delivering energy in the form of compressed air under a constant pressure by hydraulically compensating for pressure variations in a reservoir by permanently connecting the reservoir to a lake and by dissipating energy of air dissolved in water by reducing the concentration of the air in the water by communicating the lower portion of a conduit, which contains gasified water, with non-gasified water from the lake whereby to block the flow of gasified water completely through the conduit. Furthermore, a plant of the invention uses a well containing a conduit on which is mounted a unidirectional valve for achieving the dilution.

9 Claims, 3 Drawing Figures

METHOD AND PLANT FOR THE STORAGE AND RECOVERY OF ENERGY FROM A RESERVOIR

The present invention relates generally and has essentially for its object a method of storage and recovery of energy from a reservoir wherein, in order to store energy, compressed air or gas is stored and in order to recover the stored energy in the form of compressed air or gas, the compressed air or gas is made to work in, for instance, expansion turbines, or in turbo-jets; the invention also relates to a plant for the carrying out of the said method.

A plant also capable of storing energy in and recovering energy from a reservoir is disclosed in U.S. Pat. application Ser. No. 226,553, Filed Feb. 15, 1972, now U.S. Pat. No. 3,757,517, In fact, the invention relates in particular to a mehtod of storage and recovery of energy from a reservoir wherein the energy exchanges take place, as above indicated, but under substantially constant pressure.

Energy storage and recovery operations from a reservoir for use particularly in electric-power production plants, were not effected heretofore under a constant pressure. The operation by which energy was stored during off-peak hours consisted in compressing air under a more or less high pressure in the reservoir and thus required the compressor set to work under a variable load. The operation by which energy was recovered during peak hours consisted, for example, of expanding the compressed air to drive expansion turbines which, as the reservoir emptied, worked with a decreasing efficiency and supplied a decreasing power as the pressure in the reservoir decreased. In practice, a residual pressure had to be retained in the reservoir, thus reducing the effective capacity of the reservoir. It is an object of the invention to avoid the foregoing difficulties by operating the reservoir under constant pressure.

Theoretically it should be possible to deal with the foregoing problems by connecting the reservoir to a water reserve such as, for instance, a lake, located above the reservoir at such an altitude that the pressure of the water column connecting the lake to the reservoir is substantially equal to the desired maximum pressure of the compressed gas in the reservoir. While such hydraulic compensation has the advantage of being premised on a simple principle and of being obtained at a low cost, since a simple conduit is sufficient to connect the lake to the reservoir, this theoretical solution is not in fact feasible, for it disregards the phenomenon of dissolution of air in the water.

For example, during the recovery of energy, water will enter the reservoir, come into contact with the stored compressed air and will dissolve part of the latter. Now at temperatures close to 0°C, one litre of water dissolves to saturation about 0.1 litre of air. Accordingly, if water is saturated with air during the energy recovery phase, during which water fills the reservoir, one tenth of the total maximum energy storable in the plant will in fact be stored in the water, in the form of compressed air dissolved in water when, as indicated, the water completely fills the reservoir. On the other hand, during storage of compressed air in the reservoir (when energy is not recovered), the aerated or gasified water contained therein will be expelled into the water column conduit connecting the reservoir to the lake and will expand during its ascendancy. This expansion will result in degasification of the water with consequent release of the energy in the air dissolved in the water. The gasified water, unless movement thereof is inhibited through the entire length of the water column, would rise therein for reasons mentioned and would ultimately discharge into the lake. Such ascending flow of gasified water into the lake would rapidly empty the water from the reservoir which under such circumstance could not be used to pressurize air at a constant pressure.

The present invention is directed to a method and plant which solve the above-mentioned difficulties. It is characterized in that, in order to store or deliver the compressed air or gas under a substantially contant pressure, a hydraulic compensation for the reservoir is provided by constantly keeping it connected to a water reserve (or lake), the volume of which is much greater than that of the reservoir and which is located at a higher level so that the manostatic pressure of the water column connecting the reservoir to the said water reserve is substantially equal to the desired storage pressure and in that during the periods of energy storage in the reservoir, when the water contained therein is expelled into the column, the energy stored by the air--; or gas dissolved in the water when air or gas is--; introduced into the reservoir during the preceding period of energy recovery, is dissipated by blocking the flow of gasified water completely through the water column by diluting the gasified water, at a predetermined level thereof in the water column, with the non-gasified water.

Thus, according to the invention, the noted dilution causes a reduction of energy loss occurring when air is freed from the water in which it is dissolved; in addition, the energy stored in the gasified water serves to induce flow of non-gasified water from the lake into the water column, and the kinetic energy imparted by the air to the non-gasified water flow, during its ascending motion over several hundred meters, dissipates the energy stored in the gasified water and thereby ensures self-regulating dissipation of such energy, thereby also preventing pressure surges, which would otherwise occur when stored energy is recovered.

The present invention also relates to a plant for the carrying out the method, the said plant being characterized in that it comprises a conduit connected at its lower portion with the reservoir and at its upper portion with a water reserve, the volume of which is much greater than that of the reservoir, such as for instance a lake located above the reservoir at such an altitude that the pressure of water in said conduit substantially compensates for the pressure of the air or gas stored in the reservoir, a water pipe being provided for conveying the water from the lake to a lower portion of the conduit and communicating therewith at least at its lower portion through movable means which allow the water within the pipe to pass from the pipe into the conduit.

The design of the plant according to the invention is a simple one, since it uses only two conduits which can advantageously be concentric, and one of which is formed, for example, by the pit formed in constructing the reservoir, and the other by a smaller cross section pipe, including relatively low priced non-return valves of a type known per se.

The invention will appear more clearly from the following description made with reference to the appended drawings illustrating a schematic diagram of a plant designed according to the invention. In the said drawings.

Figure 1:
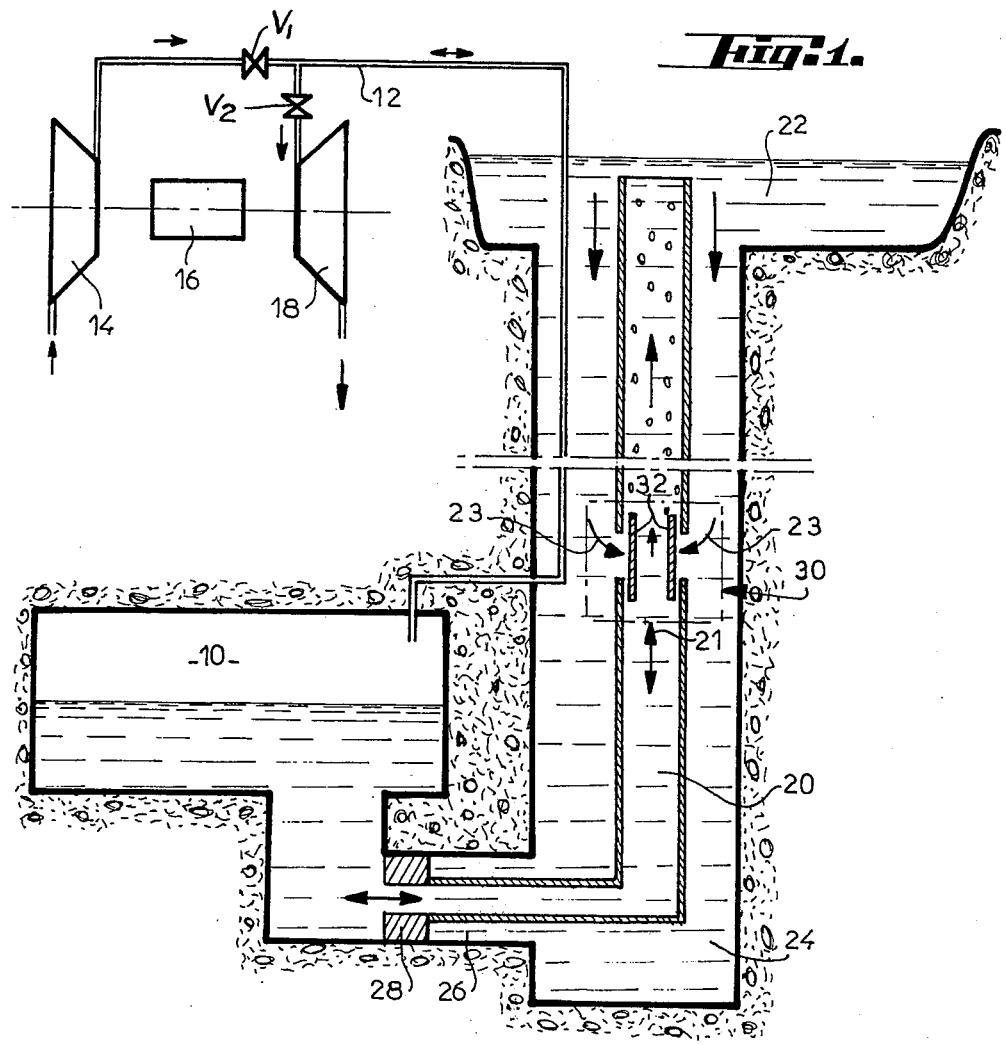
FIG. 1 is a diagrammatic view illustrating a plant according to the invention.

According to the form of embodiment illustrated, the plant comprises an underground reservoir 10 connected by a pipe 12 to an energy production set comprising a compressor 14 driven by a motor 16 and a turbine 18 driving an alternator which, in the example illustrated, also forms the motor 16.

As may be observed from FIG. 1 of the drawing, valve $V_1$ is interposed in pipe 12 downstream of compressor 14 whereas valve $V_2$ is connected in a branch conduit connecting pipe 12 with the inlet of turbine 18. As will be readily appreciated by persons skilled in the art to which the invention pertains, during the energy storage periods valve $V_1$ is open and valve $V_2$ is closed so as to permit a stream of pressurized gas from the compressor to be introduced into reservoir 10. At such times motor 16 drives the compressor. When it is desirable to recover energy from the reservoir valve $V_1$ is closed and valve $V_2$ is opened. The compressor is disconnected from the motor 16 and the stream of pressurized gas withdrawn from the reservoir is introduced into the inlet of the turbine for the driving of same. The present description has not been burdened with the constructional details of the operative connections between the compressor, motor-alternator and turbine since these are well known to persons versed in the art and the compressor set per se is merely representative of one type of work zone where the energy recovered from the reservoir may be transformed into useful work.

On the other hand, the reservoir 10 is connected by a conduit 20 to a lake 22. The conduit 20 is contained in a well 24 bored for the construction of a reservoir 10 which communicates therewith through an access tunnel 26 but is isolated therefrom by a seal 28. The upper ends of the conduit 20 and the well 24 open into the lake 22.

It should be noted that in order to facilitate the understanding of the drawings, the section of the conduit 20 has been considerably enlarged with respect to the dimensions of the well, which themselves are enlarged with respect to those of the reservoir.

Figure 2:
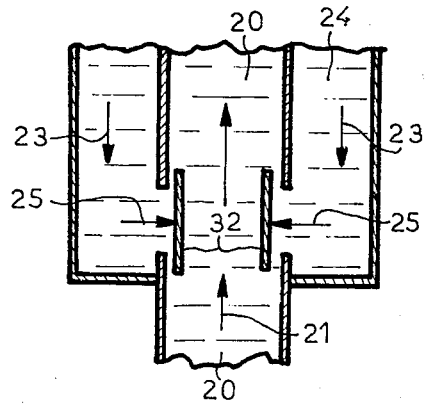
FIG. 2 is a diagrammatic view illustrating the operation of the unidirectional device.
Figure 3:
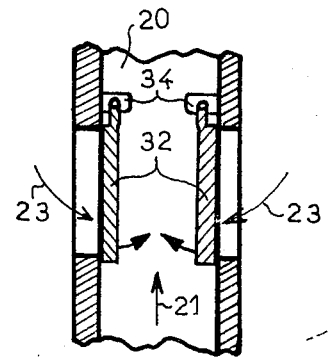
FIG. 3 shows, by way of example, a type of non-return valve which can be used in the plant shown in FIGS. 1 and 2.

The conduit 20 is provided at its lower portion with a undirectional device 30, the operation of which is illustrated in FIG. 2 and one of the possible designs of which is shown in FIG. 3.

In FIG. 2, which is a sectional view of the well 24 at the level of the device 30, arrows indicated by odd numbers show the operation of this device which is applied on the walls of the conduit 20. The water expelled from the reservoir 10 begins to be degasified at the level of the device 30 when rising in the conduit 20 as shown by arrow 21. At this level, the pressure difference between the water column within the conduit 20 and the annular water column between the conduit 20 and the well 24 created by the difference in density between the lighter aerated water contained in the conduit and the non-aerated water proceeding from the lake, produces a force indicated by the arrow 25, applied on the flaps 32 of the device 30. Thus, the flaps open in proportion to the force 25 and a flow of non-aerated water 23 penetrates into the conduit depending upon the said pressure difference; therefore, this water flow is the more important, the greater the flow of aerated water, thus resulting in a self-regulation of the phenomenon.

To obtain such a device, a non-return valve such as the one shown in FIG. 3 can be used if the conduit 20, at least at this level, is rectangular in cross-section. The valve 30 is constituted by flaps 32 articulated on hinge pins 34 secured to the upper portions of openings provided in the walls of the conduit 20. Other kinds of valves can also be contemplated.

Of course, the invention is by no means limited to the form of embodiment described and illustrated, which has been given by way of example only. Thus, for instance, it is possible to remove the non-return valve and leave only the openings, by modifying, if necessary, the shape of the conduit at this level, for example by providing a funnel, the larger base of which is turned downwards and which channels the aerated water in the lower conduit during its ascending motion. The invention therefore comprises all the means constituting technical equivalents to the means described as well as their combinations, should the latter be carried out according to the spirit of the invention.

What is claimed is:

1. Method for the storage in and recovery of energy from an enclosed reservoir in which such energy is stored in the form of a compressed gas and is recovered through work performed by said gas upon withdrawal from said reservoir, comprising the steps of: introducing gas under pressure into said enclosed reservoir which is at least partially filled with water to store the gas therein at a substantially constant pressure, said water being gasified upon absorption of said pressurized gas, maintaining water pressure within said reservoir substantially equal to the pressure of the stored gas therein by means of (a) a column of water interconnecting said reservoir below the interface of the water and pressurized gas therein and (b) a water reserve completely surrounding the column of gasified water and being of a greater volumn than said reservoir, said water reserve and said column of water having surface levels higher than the water surface level in said reservoir, periodically recovering energy from said reservoir by withdrawing gas from said reservoir at said constant pressure for use in a work zone, and, during pressurization of gas in said reservoir, blocking the flow of gasified water completely through said column of water by communicating the gasified water in said column of water, at a predetermined level thereof, with said non-gasified water in the water reserve to dilute the concentration of the pressurized gas in the water for dissipating the energy in the gas and thereby preventing water in the reservoir from being emptied during pressurization.

2. Method according to claim 1, wherein the dilution with non-gasified water is performed at least substantially at the level of the lower third of the length of said water column.

3. Plant for the storage and recovery of energy comprising at least one compressed gas reservoir at least partially filled with water, a compressor set, a pipe interconnecting said compressor set with said gas reservoir and being adapted to supply gas under pressure into said reservoir, a work performing means also connected through the intermediary of valve means to said pipe for operation of the work performing means at least partially by the compressed gas in the reservoir, a conduit connected at a lower portion thereof in communication with said reservoir and at an upper portion thereof with a water reserve, the water volume of which is substantially greater than that of the reservoir, said water reserve being located above said reservoir at a level to exert a pressure in said reservoir which substantially equals the pressure of the gas in the reservoir, a second pipe for making available water from the water reserve to an intermediate zone of said conduit, and means in said intermediate zone of said conduit and automatically operable as a function of relative water density in the second pipe and in said conduit for permitting water in the conduit to intermix with water in the second pipe at said intermediate zone of said conduit to thereby prevent water in the reservoir from being emptied into the water reserve during pressurization of the gas in the reservoir.

4. Plant according to claim 3, wherein said means allowing the water to be introduced from said second pipe into said conduit are unidirectional means.

5. Plant according to claim 4, wherein said means allowing the water to be introduced from said second pipe into said conduit are mounted on said conduit.

6. Plant according to claim 6, wherein the means allowing the water to be introduced from said second pipe into said conduit are provided at least in the region of the lower one-third length of the conduit.

7. Plant according to claim 6, wherein said conduit is mounted within said second pipe coaxially therewith.

8. Plant according to claim 7, wherein said reserve is a lake, said reservoir being installed in the ground under said lake and said second pipe being a well dug underground between said lake and said reservoir.

9. Plant according to claim 3, wherein said conduit is mounted within said second pipe and extends along the major length portion of the second pipe.

* * * * *